(12) United States Patent
Müller

(10) Patent No.: US 11,202,513 B2
(45) Date of Patent: Dec. 21, 2021

(54) ELECTROMOTIVE FURNITURE DRIVE

(71) Applicants: DewertOkin GmbH, Kirchlengern (DE); DEWERTOKIN TECHNOLOGY GROUP CO., LTD, Jiaxing (CN)

(72) Inventor: Sven Müller, Kirchlengern (DE)

(73) Assignee: DEWERTOKIN TECHNOLOGY GROUP CO., LTD, Zhejiang (CN)

( * ) Notice: Subject to any disclaimer, the term of this patent is extended or adjusted under 35 U.S.C. 154(b) by 0 days.

(21) Appl. No.: 16/982,942

(22) PCT Filed: Mar. 22, 2019

(86) PCT No.: PCT/EP2019/057269
§ 371 (c)(1),
(2) Date: Sep. 21, 2020

(87) PCT Pub. No.: WO2019/180218
PCT Pub. Date: Sep. 26, 2019

(65) Prior Publication Data
US 2021/0030164 A1    Feb. 4, 2021

(30) Foreign Application Priority Data
Mar. 22, 2018   (DE) .................. 10 2018 106 789.5

(51) Int. Cl.
*A47C 20/04* (2006.01)
*F16H 1/22* (2006.01)
*F16H 25/20* (2006.01)

(52) U.S. Cl.
CPC .......... *A47C 20/041* (2013.01); *F16H 1/225* (2013.01); *F16H 25/20* (2013.01); *F16H 2025/209* (2013.01); *F16H 2025/2081* (2013.01)

(58) Field of Classification Search
CPC .. F16H 1/255; F16H 25/20; F16H 2025/2081; F16H 2025/209; A47C 20/041
See application file for complete search history.

(56) References Cited

U.S. PATENT DOCUMENTS 2,398,841 A    3/1943  Morris
4,790,201 A *  12/1988 Gheddo .............. B62D 33/067
                                                74/89.37

(Continued)

FOREIGN PATENT DOCUMENTS

DE    202016106011    12/2016
WO    WO 02/29284     4/2002
WO    WO 2016/015731  2/2016

OTHER PUBLICATIONS

International Search Report issued by the European Patent Office in International Application PCT/EP2019/057269 dated May 23, 2019.

*Primary Examiner* — David M Fenstermacher
(74) *Attorney, Agent, or Firm* — Henry M. Feiereisen LLC

(57) ABSTRACT

An electromotive furniture drive includes a housing having an opening, a drive motor attached to the housing and including an output shaft, and a standpipe inserted into the housing laterally in a form-fitting manner. The standpipe has an outer wall formed with a transverse groove, with a lifting spindle arranged in the standpipe. A gear assembly is arranged in the housing and configured to couple the output shaft of the drive motor to the lifting spindle. A locking element is configured to engage in the transverse groove and held in a recess in the housing.

21 Claims, 6 Drawing Sheets

(56) References Cited

U.S. PATENT DOCUMENTS

| | | | | |
|---|---|---|---|---|
| 5,111,708 | A * | 5/1992 | Brusasco | F16F 1/373 |
| | | | | 310/83 |
| 5,667,283 | A * | 9/1997 | Drennen | B60T 8/00 |
| | | | | 303/115.2 |
| 6,024,422 | A * | 2/2000 | Drennen | B60T 8/00 |
| | | | | 303/115.2 |
| 6,234,034 | B1 * | 5/2001 | Ando | F16H 25/2472 |
| | | | | 187/267 |
| 6,259,175 | B1 * | 7/2001 | Alfano | F16H 25/2021 |
| | | | | 310/20 |
| 7,066,041 | B2 * | 6/2006 | Nielsen | A47C 20/041 |
| | | | | 74/425 |
| 9,303,740 | B2 * | 4/2016 | Wu | F16H 25/20 |
| 9,790,969 | B2 * | 10/2017 | Fenn | F16H 25/20 |
| 9,797,491 | B2 * | 10/2017 | Tseng | B60T 17/22 |
| 9,933,058 | B1 * | 4/2018 | Muster | F16H 25/2015 |
| 9,989,133 | B2 * | 6/2018 | Wu | F16H 57/039 |
| 10,370,897 | B2 * | 8/2019 | Birkert | F16H 25/20 |
| 10,527,141 | B2 * | 1/2020 | Huebner | F16H 25/2204 |
| 10,683,921 | B2 * | 6/2020 | Gnebner | F16H 48/34 |
| 10,837,529 | B2 * | 11/2020 | Macias Cubeiro | B64D 29/08 |
| 10,907,712 | B2 * | 2/2021 | Bastide | F16H 25/2025 |
| 2016/0025199 | A1 * | 1/2016 | Boone | B64C 13/50 |
| | | | | 74/89.38 |
| 2018/0045285 | A1 | 2/2018 | Wu | |
| 2019/0277379 | A1 * | 9/2019 | Kim | F16H 25/2204 |
| 2020/0032741 | A1 * | 1/2020 | Werquin | F16H 25/20 |

* cited by examiner

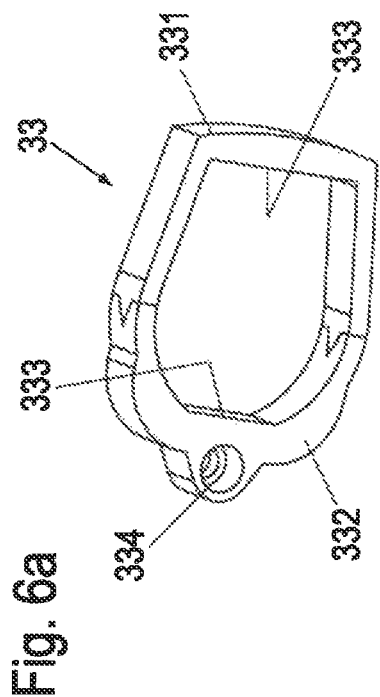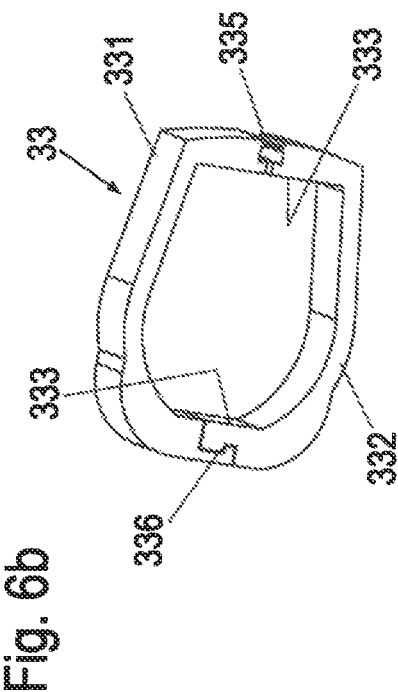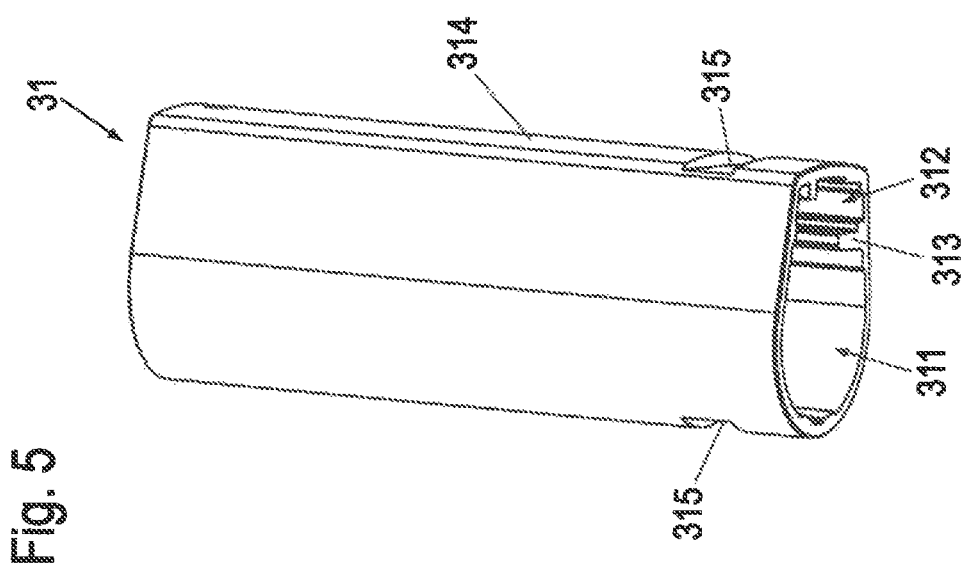

ELECTROMOTIVE FURNITURE DRIVE

CROSS-REFERENCES TO RELATED APPLICATIONS

This application is the U.S. National Stage of International Application No. PCT/EP2019/057209, filed Mar. 22, 2019, which designated the United States and has been published as International Publication No. WO 2019/180218 A1 and which claims the priority of German Patent Application, Serial No. 10 2018 106 789.5, filed Mar. 22, 2018, pursuant to 35 U.S.C. 119(a)-(d).

BACKGROUND OF THE INVENTION

The invention relates to an electromotive furniture drive having a housing to which a drive motor and a standpipe are attached, wherein a lifting spindle is arranged in the standpipe, and wherein an output shaft of the drive motor is coupled to the lifting spindle via a gear assembly arranged in the housing.

Electromotive furniture drives are used in furniture, for example, bedroom furniture or resting furniture such as beds, sofa beds or armchairs, in order to be able to conveniently adjust at least one movable furniture part relative to another furniture part, for example by pivoting it. In a bed, for example, a back or leg section can be raised or lowered relative to a middle section of the bed.

Furniture drives with a lift spindle, often also referred to as spindle drives, are particularly suitable as linear drives whose output member can be moved linearly in relation to a main body of the furniture drive. Often two tubular profiles are provided which can be inserted one into the other, a standpipe and a lifting tube, wherein the lift spindle is arranged rotatably but stationary in relation to the standpipe and a spindle nut is coupled to the lifting tube in order to move the lifting tube out of or into the standpipe when the lift spindle is turned. In alternative designs, it may be provided that the lift spindle is designed to be displaceable but rotationally fixed and the spindle nut is driven by the drive motor and mounted rotatably but fixedly. However, a design with a stationary spindle and a movable standpipe or lifting tube that can be moved into each other is usually the more compact arrangement.

For mounting, it is known from the state of the art to provide the standpipe with a flange, which is placed on a (gear-) housing of the furniture drive or inserted into a recess and connected to the housing, e.g. screwed. This is technically complex in terms of production because the standpipe is usually a profile element that is cut off from a running profile tube. Accordingly, the flange must be manufactured separately and connected to the profile tube, e.g. welded or riveted. In addition, the bolting of the flange to the housing is complex.

It is an object of the present invention to create an electromotive furniture drive of the type mentioned above in which the standpipe can be reliably connected to the housing of the furniture drive with as few modifications as possible and with little assembly effort.

SUMMARY OF THE INVENTION

This object is solved by an electromotive furniture drive with the features of independent claim. Advantageous designs and further developments are the subject matter of the dependent claims.

An electromotive furniture drive of the type mentioned above according to the invention is characterized in that the housing has an opening into which the standpipe is inserted laterally in a form-fitting manner, and in that the standpipe has at least one transverse groove made in an outer wall, there being a locking element which engages in the at least one transverse groove and which is held in a recess in the housing.

With this type of mounting, the standpipe is held laterally by the most precisely fitting opening in the housing. In longitudinal direction the standpipe is fixed by the locking element. The locking element is fixed to the standpipe in the longitudinal direction by the transverse groove; the locking element is then held in the housing by the holder in the recess of the housing. In this way forces acting on the standpipe in the longitudinal direction are diverted into the housing.

Compared to, for example, a substance-to-substance bond or a force-fitting attachment of a flange to the standpipe, the insertion of one or more transverse grooves represents only a small additional manufacturing effort for the standpipe. The locking element can easily be inserted into the recess and is also radially fixed to the standpipe by inserting it into the recess of the housing.

In an advantageous design of the electromotive furniture drive, the locking element is a clamping ring that is placed around the standpipe.

The clamping ring is advantageously made of plastic, whereas the standpipe is a metal profile tube section. The preferred metal used is aluminum, which is light and stable.

In one design, the clamping ring can be made up of two sections which can be inserted into each other to insert the clamping ring around the standpipe and at least one transverse groove in it. In an alternative design, the clamping ring is made up of two sections which are connected to each other by a hinge. Preferably, the hinge can be a foil hinge, which is manufactured in one piece together with the two sections in an injection molding process.

In another advantageous design of the electromotive furniture drive, a lifting tube is linearly movable in the standpipe, which is coupled with a spindle nut that interacts with the lifting spindle.

In another advantageous design of the electromotive furniture drive, the housing has a raised dome in the area of the standpipe, into which the standpipe is positively inserted at the side. Any transverse forces acting on the standpipe (i.e. forces acting transversely to the lifting direction of the lifting tube) can thus be transferred to the housing.

In another advantageous design of the electromotive furniture drive, the locking element is inserted into the recess from the outside and is designed integrally with a section of the housing. Preferably, the locking element is designed as a pin, a slide and/or a bracket and has at least two legs in one design. Such a locking element can advantageously be inserted from the outside into the recess of the housing in the transverse groove of the standpipe after it has been inserted into the opening of the housing. A prerequisite for this is that the recess of the housing runs through the outer wall of the housing. Due to the integral design of the locking element with a housing section, the recess is then advantageously closed immediately by inserting the locking element.

In another advantageous design of the electromotive furniture drive, the housing is constructed in two parts and has an upper and a lower part. The standpipe is located on the upper part. The lower part is placed on the upper part on a side opposite the standpipe. The lower part includes a fork head or a comparable connection possibility of the electromotive furniture drive. The fork head or the connection possibility is preferably designed with the lower part and is in alignment with the lifting tube.

In the two-part design of the housing, the clamping ring is preferably held positively in a recess which is formed jointly by the upper and lower parts. In the upper part, for example, there may be a recess which accommodates the clamping ring, preferably on all sides along its circumference. The lower part of the housing, which is then placed on top, is designed in such a way that it reaches up to the clamping ring at at least one, preferably several, points in the lifting direction and thus also holds it in the lifting direction by positive locking.

In another advantageous design of the electromotive furniture drive, the gear assembly is designed as a double worm gear in which an intermediate shaft is perpendicular to the output shaft and perpendicular to the lifting spindle. The intermediate shaft has an intermediate gear in which a worm of the output shaft of the drive motor engages and another worm which engages in a spindle gear of the lifting spindle.

Alternatively, a combination of a worm gear and a screw gear can be used. In this case, for example, a worm is again arranged on the output shaft of the motor, which engages in a worm wheel of the intermediate shaft. A helical gear is then arranged or formed on the intermediate shaft, which engages in another helical gear arranged on the lifting spindle.

Preferably, the intermediate shaft of the gear assembly intersects the plane in which the lift spindle and the output shaft lie, between the lift spindle and the output shaft. The intermediate shaft lies correspondingly transversely between the lift spindle and the output shaft and thus also transversely in the (gear) housing and engages in the lift spindle and output shaft on different sides of the latter. The available space can thus be better utilized, allowing the housing and thus also the furniture drive to be constructed in a particularly compact way.

In an advantageous design of the electromotive furniture drive, the intermediate shaft has an intermediate wheel in which a worm of the output shaft of the drive motor engages and another worm which engages in a spindle wheel of the lift spindle. Preferably, the intermediate shaft intersects the plane at an angle of 30° to 75° and particularly preferably from 35° to 45°. Due to the inclined position of the intermediate shaft in the housing, the intermediate wheel is also arranged at an angle to housing sides, which means that the intermediate wheel can be designed larger than if it lies in a plane parallel or perpendicular to a housing side.

In another advantageous design, the output shaft is located centrally between the parallel longitudinal sides, whereas the lift spindle is located eccentrically between the parallel longitudinal sides. This provides more space on the side where the intermediate shaft interacts with the lift spindle, for example to be able to support the intermediate shaft in the housing.

In another advantageous design of the electromotive furniture drive, the intermediate shaft is mounted with bearing journals in plain bearings, with bearing shells formed in the upper and lower parts of the housing. Preferably, a half-shell-shaped bearing shell in the upper part and a half-shell-shaped bearing shell in the lower part complement each other to form a plain bearing for one of the bearing journals. This type of bearing for the intermediate shaft saves space and therefore has little or no effect on the size of the housing. It is also cost-effective and the intermediate shaft is easy to install.

BRIEF DESCRIPTION OF THE DRAWING

The Invention is explained in more detail below by means of an exemplary embodiment by means of the drawings, which show as follows:

FIG. 5 shows an isometric representation of a standpipe of an electromotive furniture drive;

FIG. 6 shows two exemplary embodiments of clamping rings for fixing the standpipe of FIG. 5.

DETAILED DESCRIPTION OF PREFERRED EMBODIMENTS

Figure 1:
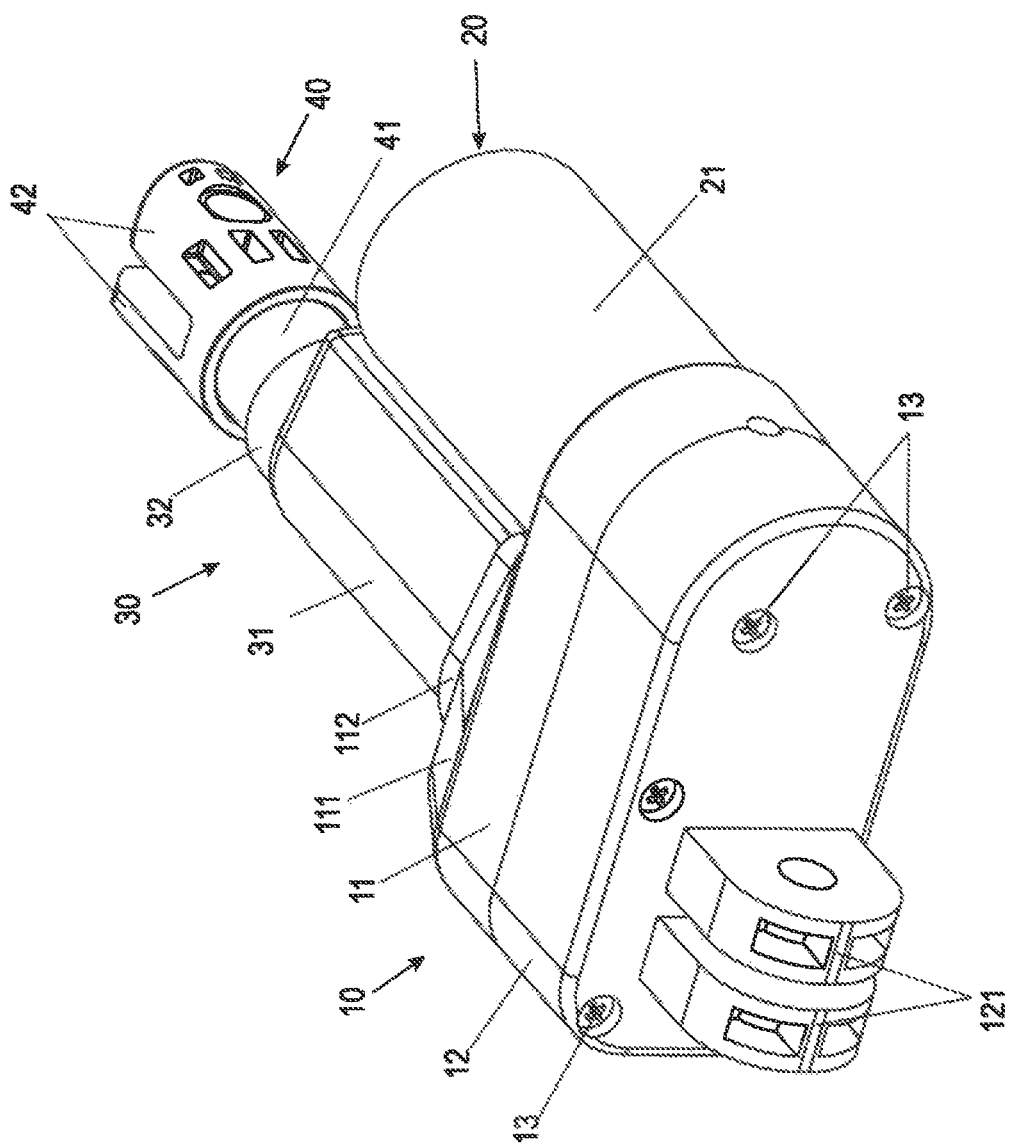
FIG. 1 shows an isometric representation of an electromotive furniture drive.

The figures show an exemplary embodiment of an electromotive furniture drive in various representations. In all figures, the same reference numerals indicate the same elements.

FIG. 1 shows the electromotive furniture drive first in an overall view in an isometric representation.

The furniture drive has a two-part housing 10, which comprises an upper part 11 and a lower part 12. Upper part 11 and lower part 12 are connected to each other with screws 13. In a further development of the illustrated furniture drive, a different type of connection between the two housing parts can be provided additionally or alternatively, for example a latching, adhesive and/or welded connection. A fork head 121 is arranged on the lower part 12, which fork head serves to couple the electromotive furniture drive to a fixed or movable furniture part or a fixed or movable part of a furniture fitting.

On the side of the housing 10 opposite to the fork head 121, the upper part 11 has a drive motor 20 and a standpipe arrangement 30 with a standpipe 31. Of the drive motor 20, only one motor housing 21 is shown in the illustration in FIG. 1. The drive motor 20 is preferably inserted with a motor flange not visible here into a recess of the upper part 11 and fastened there.

In the area of the standpipe 31, the upper part 11 is raised in relation to the area where the flange of the drive motor 20 is positioned, and has a dome 111 which ends in a collar 112 at its outer end. The standpipe 31 is inserted into this dome 111 and guided inside the dome 111. At the free end of the standpipe 31 opposite the housing 10, a guide bushing 32 is attached to the standpipe 31, in which a lifting tube 41 of a lifting tube arrangement 40 is displaceably guided.

At the outer end, a fork head 42 is attached to the lifting tube 41, which is in line with the fork head 121 and has a similar design. The fork head 42, like fork head 121, is used to connect the electric motorized furniture drive to a fixed or movable furniture part or a fixed or movable part of a furniture fitting.

The upper part 11 and the lower part 12 of the housing 10 are preferably both integral plastic parts manufactured in an injection-molding process. Likewise, the fork head 42 and the guide bushing 32 are preferably plastic elements, each of which is integrally manufactured by injection molding. The standpipe 31 and the lifting tube 41, on the other hand, are profile elements and are preferably made of a metal, especially aluminum, in order to provide the required stability in spite of low wall thicknesses.

Figure 2:
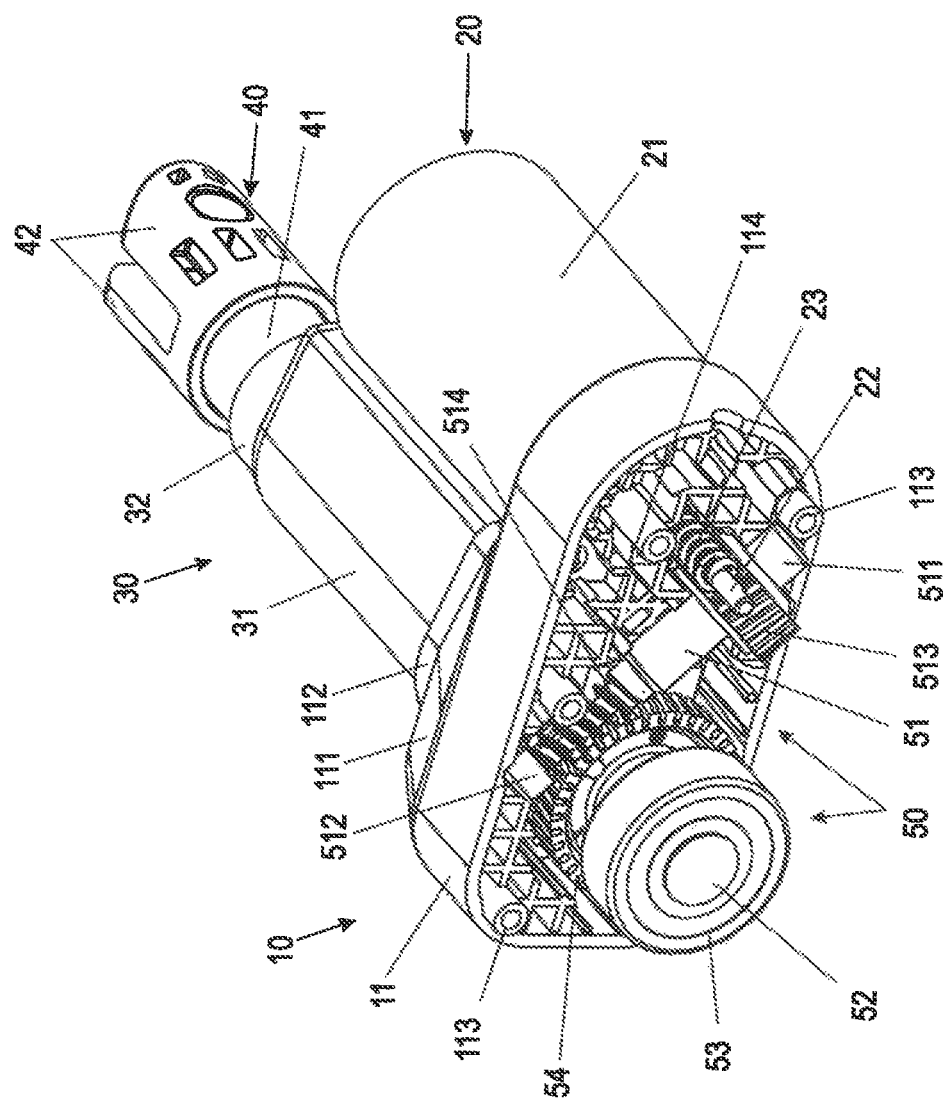
FIG. 2 shows the electromotive furniture drive from FIG. 1 with open housing.
Figure 3:
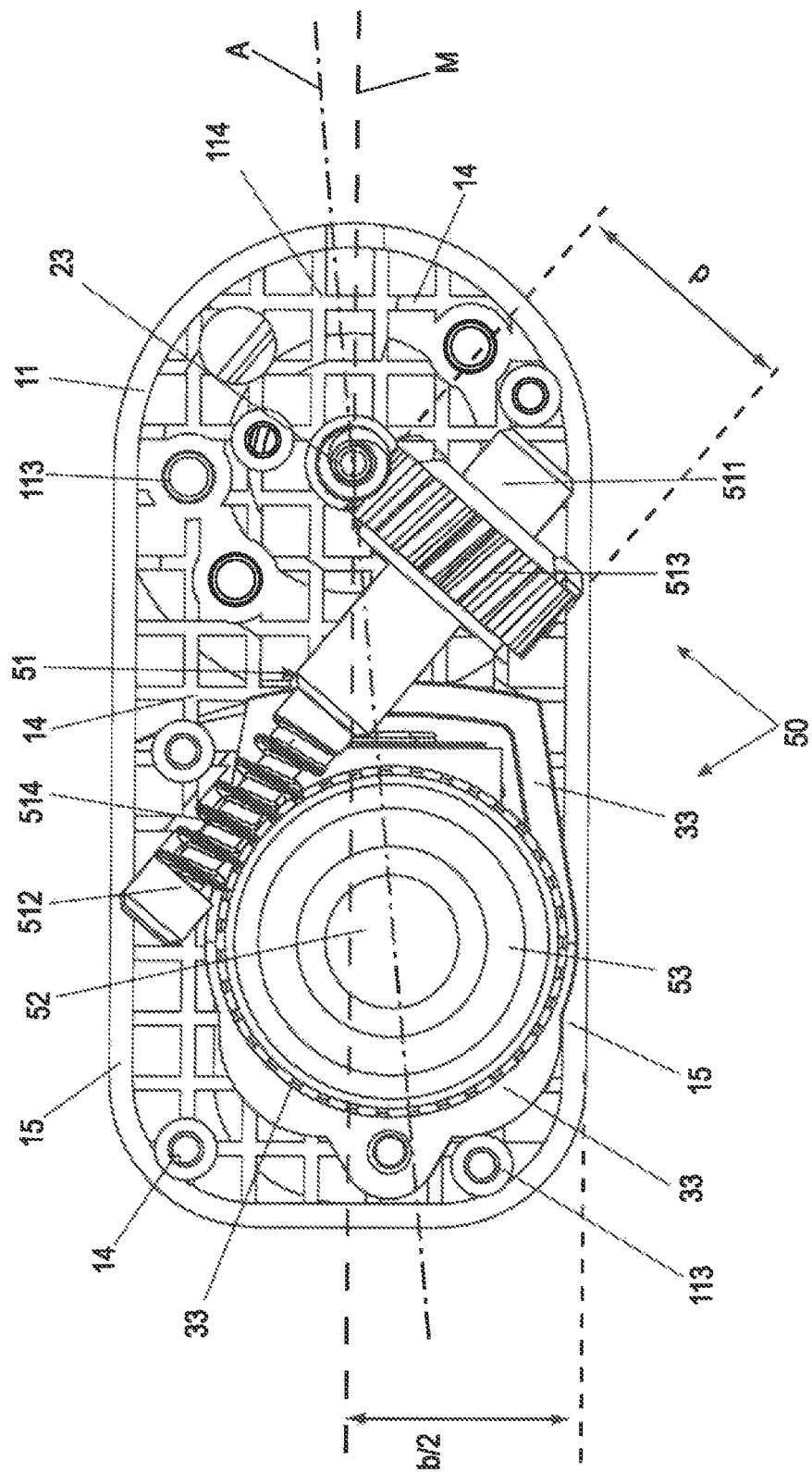
FIG. 3 shows a top view of the opened housing of FIG. 2.

FIG. 2 shows the electromotive furniture drive from FIG. 1 in the same isometric view, although the lower part 12 of the housing 10 has been removed to gain an insight into the internal structure of the furniture drive. FIG. 3 shows the opened housing 10 in a plan view of the upper part 11.

FIGS. 2 and 3 show screw domes 113 in the upper part 11, into which the screws 13 are screwed. In the lower part 11 there are corresponding screw bushings. In order to achieve a low weight and at the same time high stability, reinforcing webs 114 are formed in the upper and lower part 11, 12, e.g. as shown in a grid pattern.

A double worm gear unit 50 is accommodated in housing 10 as a gear assembly through which rotation of an output shaft 22 of the drive motor 20 is transmitted to a lift spindle 52. Only one free end of the lift spindle 52 is visible in FIGS. 2 and 3, which is mounted in a bearing 53, preferably a roller bearing. The bearing 53 is supported in the lower part 12 of the housing 10 and transmits forces from there directly to the fork head 121.

The double worm gear unit 50 comprises an intermediate shaft 51 which extends perpendicularly to the output shaft 22 and the lift spindle 52. The intermediate shaft 51 is supported in the housing 10 by bearing journals 511, 512, wherein half-shell plain bearings are formed in both the upper part 11 and the lower part 12. For assembly, the intermediate shaft 51 is inserted into the upper part 11 as shown in FIGS. 2 and 3. When closing the housing 10, the bearing shells in the upper part 11 and lower part 12 complement each other to form plain bearings for the intermediate shaft 51.

A worm, also referred to as motor worm 23 in the following, is mounted or integrally formed on the output shaft 22 and engages in a worm wheel, also referred to as intermediate wheel 513 in the following, of the intermediate shaft 51. Furthermore, a further worm 514 is formed on the intermediate shaft 51, which engages in a further worm wheel, which is mounted non-rotatably on the lift spindle 52 and is referred to as spindle wheel 54 in the following.

By designing the gear assembly as a double worm gear unit 50, a high transmission ratio between the output shaft 22 and the lift spindle 52 is achieved. Correspondingly, a high-speed drive motor 20 can be used, which generally has a smaller design for the same power as a low-speed motor. The use of a double worm gear unit already contributes to a compact design.

Furthermore, a compact design is achieved in that the intermediate shaft 51 crosses a common plane in which the output shaft 22 and the lift spindle 52 are located.

As can be seen particularly well in FIG. 3, the base of the housing 10 is essentially that of a rectangle with rounded edges. On the sides of the drive motor 20, the corners are rounded to a continuous semicircle, the diameter of which is only slightly larger than the diameter of the motor housing 21. Up and down in FIG. 3, the upper part 11 of housing 10 is bounded by parallel and straight longitudinal sides 115. In the middle between these longitudinal sides 115 there is a center plane M of the housing 10, which is marked with a dashed line in FIG. 3. Furthermore, FIG. 3 shows the plane in which the output shaft 22 and the lift spindle 52 are located. This plane is referred to below as (axial) plane A.

FIG. 3 shows that the output shaft 22 is located in the center plane M of the housing 10, but the lift spindle 52 is eccentrically positioned. Accordingly, the axis plane A and the center plane M intersect in the output shaft 22. In the example shown, the intermediate shaft 51 not only intersects the axial plane A, but also the center plane M.

As a result of the inclined position of the intermediate shaft 51 in the housing 10 (in the example shown, the intermediate shaft 51 crosses the center plane M at an angle of about 40°, for example) the intermediate wheel 513 can have a diameter d (see FIG. 3) which is at least as large as the distance between the longitudinal sides 115 and the center plane M. This distance is shown as b/2 in FIG. 3, wherein b is the distance between the two longitudinal sides 115 of the housing and thus a width of the housing in the direction perpendicular to the center plane M. By inclining the intermediate shaft 51 in the housing 10, a large transmission ratio can be achieved without having to widen the housing 10 in an orientation perpendicular to the center plane M.

Furthermore, a compact housing is achieved by placing the lift spindle 52 eccentrically in housing 10 with respect to the center plane. This provides more space on the side where the worm 514 of the intermediate shaft 51 engages in the spindle wheel 54 in order to accommodate the bearing journal 512 in housing 10.

A further measure to be able to support the intermediate shaft 51 in a housing 10 which is as compact as possible and in particular to be able to use an intermediate wheel 513 which is as large as possible is to extend the bearing shells for the bearing journals 511,512 as close as possible to or, as shown, into a wall of the housing 10. In the area of the circumference of the intermediate wheel 513, the example shown also includes a recess in the wall of the housing 10 into which the intermediate wheel 513 projects in order to be able to insert an intermediate wheel 513 which is as large as possible.

Figure 4:
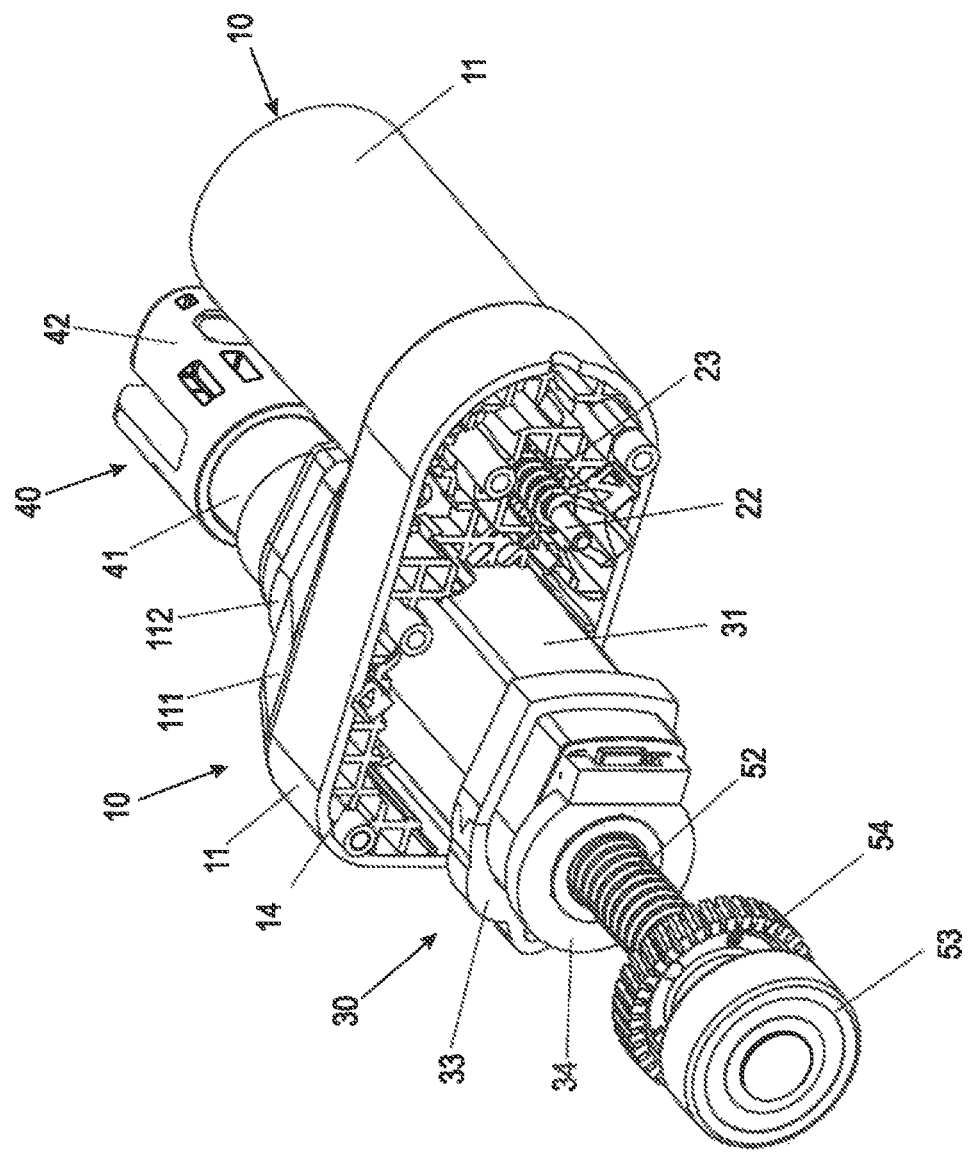
FIG. 4 shows the electromotive furniture drive of FIGS. 1 to 3 in a partially assembled state in an isometric representation.

FIG. 4 again shows an isometric representation of the electromotive furniture drive comparable to FIG. 2, although the standpipe 31 is only partially inserted to illustrate the attachment of the standpipe 31 in housing 10. This FIG. 4 also shows a threaded section of spindle 52.

As already mentioned in connection with FIG. 1, the upper part 11 of the housing 10 has a dome 111 with a collar 112, into which the standpipe 31 is inserted with a perfect fit. The standpipe 31 is described in more detail below in connection with FIG. 5. In an end area of the standpipe 31 facing the spindle wheel 54, a clamping ring 33 is placed around the standpipe 31. This clamping ring 33 engages in transverse grooves of the standpipe 31 and is therefore not displaceable in longitudinal direction in relation to the standpipe 31.

When inserting the standpipe 31 into the upper part 11, the clamping ring 33 rests in a recess in the upper part 11 adapted to its circumference. In this way the clamping ring 33 is fixed in the direction of the dome 111 or the collar 112 and with regard to its lateral position in the upper part 11. If the housing 10 is closed by placing the lower part 12 on it and connecting the lower part 12 with the upper part 11, correspondingly shaped projections of the lower part 12 press on the still accessible edge of the clamping ring 33, wherein the latter is also positively fixed in the direction of the lower part 12 in the housing 10.

FIG. 5 shows the standpipe 31 separately in an isometric drawing. The standpipe 31 has an asymmetrical profile with a main shaft 311 in which the lift spindle 52 and the lifting tube 41 are located. The main shaft 311 has an approximately round cross-section. On a flattened side 314 of the standpipe 31 there is a limit switch shaft 212, also extending in a longitudinal direction, in which microswitches, which act as limit switches for the electromotive furniture drive, are positioned. Between the main shaft 311 and the limit switch shaft 312 there is an open connection over the entire length. Between the two shafts there is at least one longitudinal web 313 which also runs over the entire length. A spindle nut not shown here engages in this at least one longitudinal web 313 so that it can move in the longitudinal direction in the standpipe 31, but is secured against rotation.

On the flattened side 314 and also on the opposite curve, transverse grooves 315 are introduced into the standpipe 31 from the outside, into which the clamping ring 33 is inserted and by means of which the standpipe 31 is fixed in the housing 10 in the longitudinal direction with the aid of the clamping ring 33.

Two exemplary embodiments of suitable clamping rings 33 are shown in FIGS. 6a and 6b, each in an isometric diagram. The clamping ring 33 shown in FIG. 6a is the one also visible in FIG. 4. It is made up of two interlocking sections 331 and 332 in order to be able to insert the standpipe 31 into the transverse grooves 315. Accordingly, it has two straight webs 333 on the inside which engage in the transverse grooves 315. In the example in FIG. 6a, there is also a fastening possibility 334 for a screw or a locking head to hold the clamping ring 33 in position before closing the housing 10.

The alternatively usable clamping ring 33 as shown in FIG. 6b has two sections 331,332 which can be pivoted against each other and which are connected to each other on one side (in FIG. 6b on the right side) by a hinge 335. On the opposite side a latching mechanism 336 is provided to close the clamping ring 33. The resulting integral design of the clamping ring 33 simplifies the assembly process.

Figure 7:
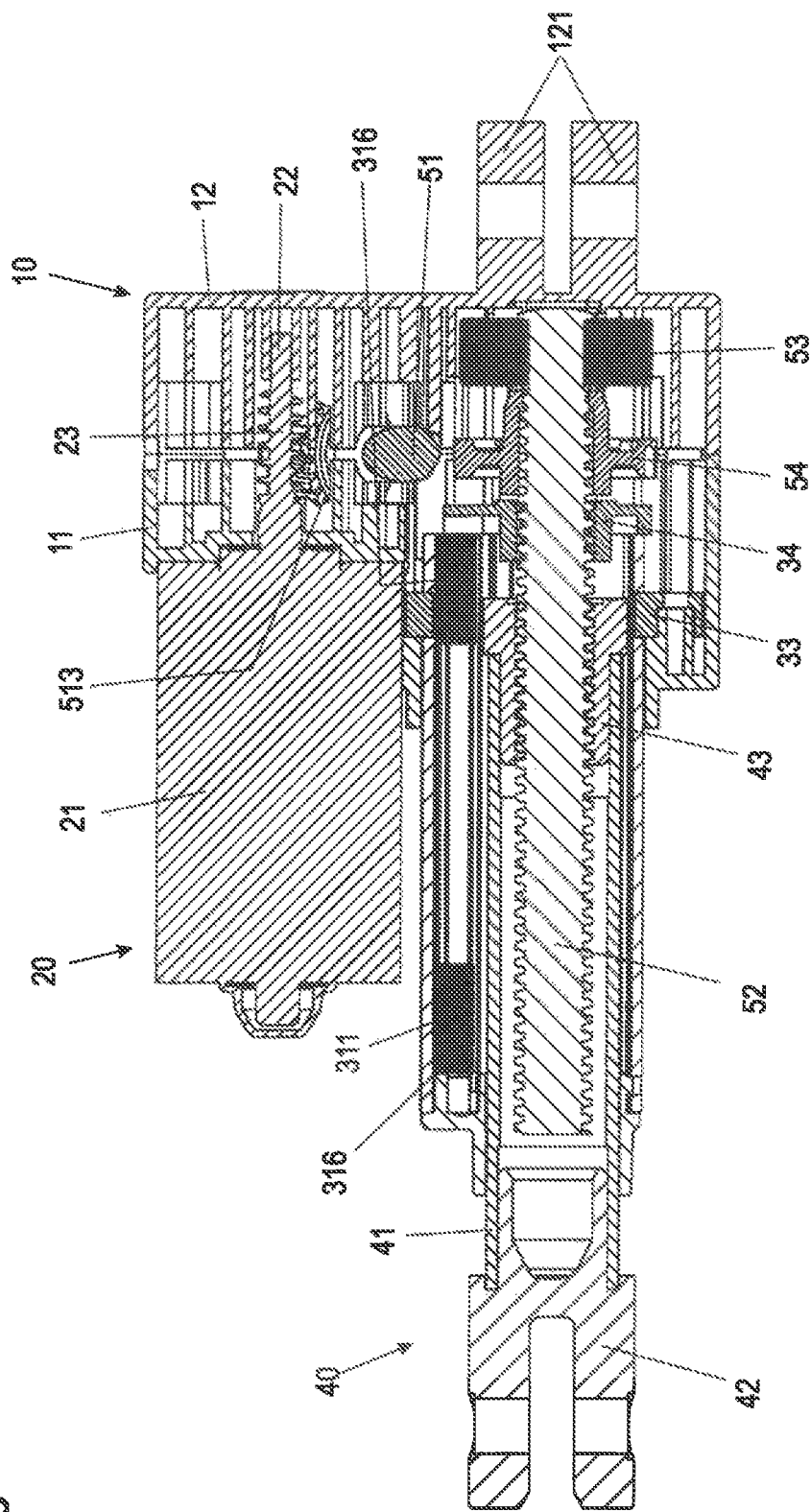
FIG. 7 shows a sectional view of the furniture drive of FIGS. 1 to 4.

FIG. 7 finally shows the overall design of the electromotive furniture drive of FIG. 1 to 4 again in a sectional view. An offset section is selected in this illustration, in which the section in the area of the drive motor 20 extends in the center plane M (see FIG. 3). In the area of the standpipe 31 or lifting tube 41, the section extends in a parallel plane centrally through the lift spindle 52.

In this sectional view, the already mentioned spindle nut 43 and its engagement in the longitudinal webs 313, which separate the limit switch shaft 312 from the main shaft 311 of the standpipe 31, is visible. The spindle nut 43 is firmly connected to the lifting tube 41. When the lift spindle 52 rotates, the spindle nut 43 and thus the lifting tube 41 and the fork head 42 move linearly out of or into the standpipe 31.

Furthermore, this illustration shows two limit switches 316 which are actuated by an extension at the spindle nut 43 and switch off the drive motor 20 directly or via control electronics when one or the other end position is reached.

What is claimed is:

1. An electromotive furniture drive, comprising:
a housing having an opening;
a drive motor attached to the housing and including an output shaft;
a standpipe inserted into the housing laterally in a form-fitting manner, said standpipe having an outer wall formed with a transverse groove;
a lifting spindle arranged in the standpipe;
a gear assembly arranged in the housing and configured to couple the output shaft of the drive motor to the lifting spindle; and
a locking element configured to engage in the transverse groove and held in a recess in the housing, wherein the locking element is a clamping ring placed around the standpipe.

2. The electromotive furniture drive of claim 1, wherein the clamping ring is formed from two sections which are insertable into one another.

3. The electromotive furniture drive of claim 1, wherein the clamping ring is formed from two sections which are connected to one another in a hinged manner via a hinge.

4. The electromotive furniture drive of claim 3, wherein the hinge is a foil hinge, said two sections being formed in one piece together with the hinge.

5. The electromotive furniture drive of claim 1, wherein the clamping ring is made of plastic and wherein the standpipe is a section of a metal profile pipe.

6. The electromotive furniture drive of claim 1, wherein the housing is constructed in two parts defined by an upper part and a lower part, said lower part being placed on a side of the upper part, which side is distal to the standpipe.

7. The electromotive furniture drive of claim 6, wherein bearing shells are formed in the upper and lower parts of the housing.

8. The electromotive furniture drive of claim 6, wherein the gear assembly includes an intermediate shaft which extends perpendicular to the output shaft and perpendicular to the lifting spindle, wherein a half-shell-shaped bearing shell in the upper part of the housing and a half-shell-shaped bearing shell in the lower part of the housing complement each other to form a plain bearing for a bearing journal of the intermediate shaft.

9. An electromotive furniture drive, comprising:
a housing having an opening;
a drive motor attached to the housing and including an output shaft;
a standpipe inserted into the housing laterally in a form-fitting manner, said standpipe having an outer wall formed with a transverse groove;
a lifting spindle arranged in the standpipe;
a gear assembly arranged in the housing and configured to couple the output shaft of the drive motor to the lifting spindle; and
a locking element configured to engage in the transverse groove and held in a recess in the housing, wherein the locking element is inserted into the recess of the housing from outside and is formed integrally with a section of the housing.

10. An electromotive furniture drive, comprising:
a housing having an opening;
a drive motor attached to the housing and including an output shaft;
a standpipe inserted into the housing laterally in a form-fitting manner, said standpipe having an outer wall formed with a transverse groove;
a lifting spindle arranged in the standpipe;
a gear assembly arranged in the housing and configured to couple the output shaft of the drive motor to the lifting spindle; and
a locking element configured to engage in the transverse groove and held in a recess in the housing
wherein the housing is constructed in two parts defined by an upper part and a lower part, said lower part being placed on a side of the upper part, which side is distal to the standpipe, and
wherein the locking element is a clamping ring placed around the standpipe and held in a recess between the upper and lower parts in a form-fitting manner.

11. The electromotive furniture drive of claim 10, wherein the locking element is designed as at least one member selected from the group consisting of a pin, a slide, end a bracket.

12. The electromotive furniture drive of claim 10, wherein the locking element has at least two legs.

13. The electromotive furniture drive of claim 10, wherein the housing has a raised dome in a region of the standpipe, said standpipe being inserted laterally in a form-fitting manner in the raised dome.

14. The electromotive furniture drive of claim 10, wherein the gear assembly is a double worm gear or a combination of a worm and a screw gear, said gear assembly including an intermediate shaft which extends perpendicular to the output shaft and perpendicular to the lifting spindle.

15. The electromotive furniture drive of claim 14, wherein the lift spindle and the output shaft lie in a plane, said intermediate shaft intersecting the plane between the lift spindle and the output shaft.

16. The electromotive furniture drive of claim 15, wherein the intermediate shaft intersects the plane at an angle of 30° to 75°, preferably 35° to 45° C.

17. The electromotive furniture drive of claim 14, wherein the lift spindle and the output shaft extend parallel to one another and perpendicular to the intermediate shaft.

18. The electromotive furniture drive of claim 14, wherein the intermediate shaft is mounted with bearing journals in plain bearings.

19. The electromotive furniture drive of claim 14, wherein the intermediate shaft includes an intermediate wheel which interacts with a worm of the drive shaft and is defined by a diameter, said housing having two parallel longitudinal sides at a distance from one another, with the diameter of the intermediate wheel being greater than or equal to half the distance.

20. The electromotive furniture drive of claim 19, wherein the output shaft lies centrally between the parallel longitudinal sides and wherein the lift spindle lies eccentrically between the parallel longitudinal sides.

21. The electromotive furniture drive of claim 19, wherein the drive motor includes a motor housing, with the distance between the parallel longitudinal sides substantially corresponding to a dimension of the motor housing in a direction of the distance.

* * * * *